June 24, 1958
DONALD H. HAUG
NOW BY CHANGE OF NAME
DONALD JEFFERY SANDS
FOLDABLE BEACH CART
2,840,142
Filed Nov. 18, 1955
2 Sheets-Sheet 1
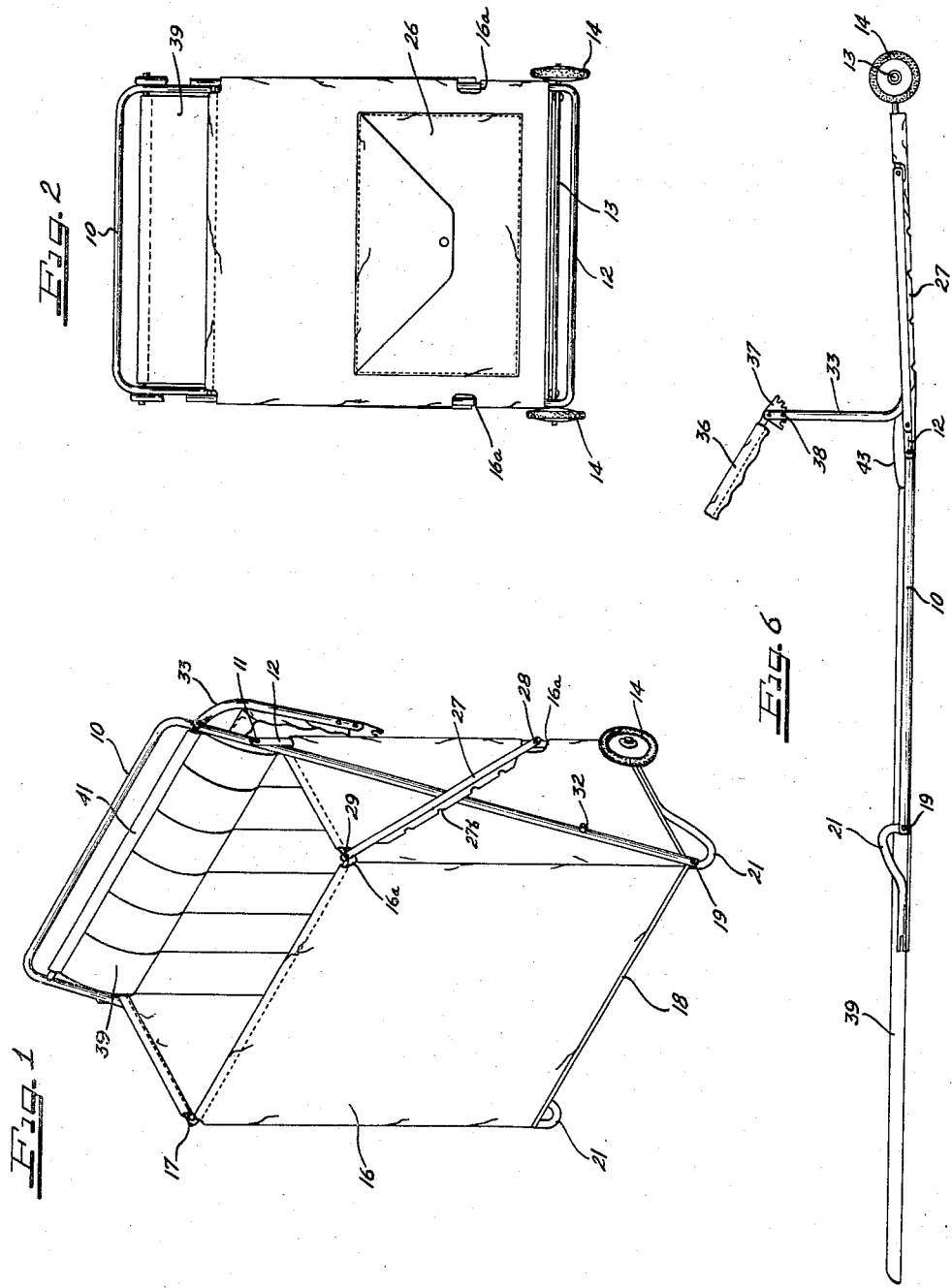
Inventor
Donald H. Haug now by Change
of name Donald Jeffery Sands
by Hill, Sherman, Meroni, Gross & Simpson
Attys.

June 24, 1958
DONALD H. HAUG
NOW BY CHANGE OF NAME
DONALD JEFFERY SANDS
FOLDABLE BEACH CART
2,840,142
Filed Nov. 18, 1955
2 Sheets-Sheet 2
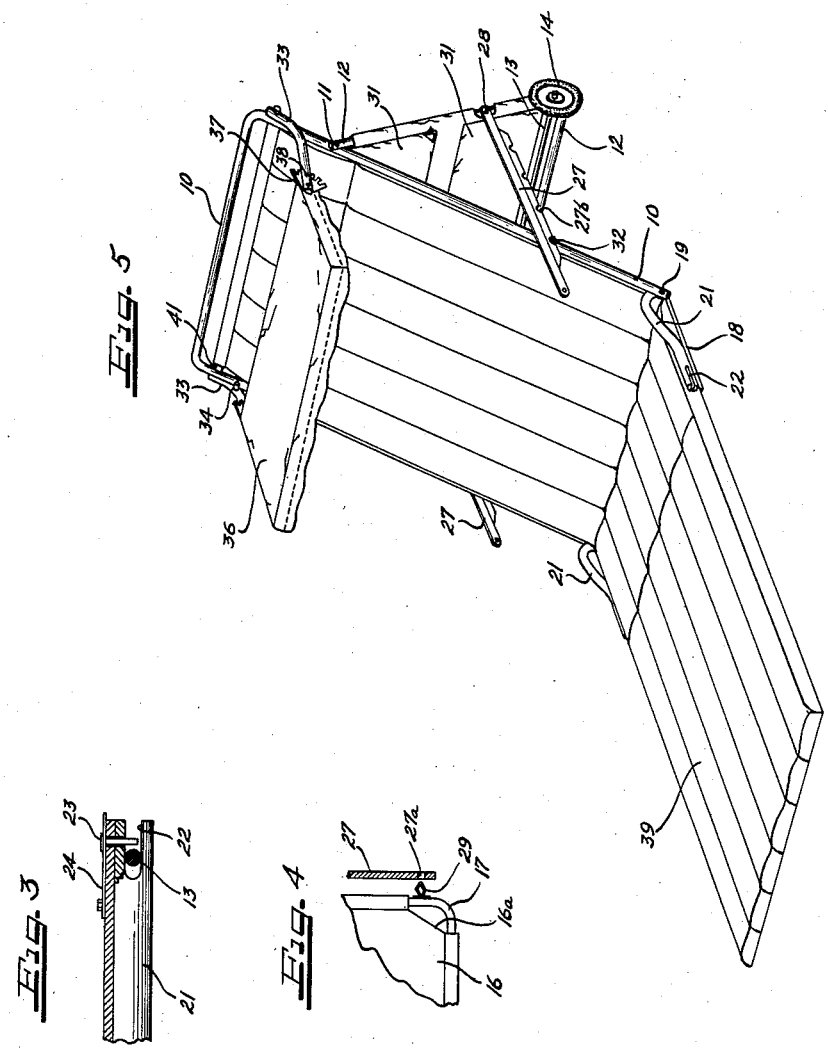
Inventor
Donald H. Haug now by change
of name Donald Jeffery Sands United States Patent Office 2,840,142
Patented June 24, 1958

2,840,142

FOLDABLE BEACH CART

Donald H. Haug, Chicago, Ill., now by change of name Donald Jeffery Sands

Application November 18, 1955, Serial No. 547,740

5 Claims. (Cl. 155—154)

The present invention is concerned with a foldable type cart which can be rapidly and easily transformed into a reclining chair and a pallet forming the basis of a bed support structure.

The cart of the present invention finds particular utility as a beach cart in that it provides ample carrying space for clothing, food, and other necessities, and can be readily folded into a reclining type chair, complete with canopy, or can be folded into a substantially flat pallet form.

In the completely folded condition, the cart is readily portable and easily manuvered over sand or the like. In its unfolded conditions, the assembly is rigid mechanically and capable of sustaining substantial loads.

An object of the present invention is to provide an improved folding cart assembly which can be readily transformed into a reclining chair or into a pallet.

Another object of the invention is to provide a simple and economical assembly of the type described which has the characteristics noted above.

A still further object of the invention is to provide an improved portable type of foldable beach cart of economical construction.

Other objects and features of the present invention will become more apparent to those skilled in the art from the following description of the attached sheets of drawings which illustrate a preferred embodiment of the invention.

In the drawings:

Figure 1 is a view in perspective of the beach cart in its folded condition, illustrating the enclosure thereby provided;

Figure 2 is a rear elevational view of the cart shown in Figure 1;

Figure 3 is a fragmentary cross sectional view illustrating detent means which may be employed to secure the frames constituting the framework of the cart together in the folded condition;

Figure 4 is a fragmentary view illustrating the manner in which the spacer arms may be secured to the framework;

Figure 5 is a view in perspective of the cart folded in position to receive a mattress or the like and thereby provide a reclining type chair; and Figure 6 is a view in elevation of the assembly shown in Figure 5 when folded to provide a bed structure.

As shown on the drawings:

In Figure 1 reference numeral 10 indicates a tubular type, generally inverted U-shaped support frame consisting of tubular aluminum or similar material. The tubular frame 10 is pivotally secured by means of spaced pins 11 to a second tubular U-shaped frame 12 which forms the reinforcing means for the rear of the cart when in its folded condition.

The U-shaped frame 12 carries an axle 13 therethrough and a pair of wheels 14 are supported for rotation on opposed ends of the axle 13.

The framework is arranged to carry a collapsible bag 16 composed of fabric such as canvas, or a suitable resinous film material. The upper end of the bag 16 is sewed onto a rectangular wire framework 17 which holds the open end of the bag in extended position when the cart is in the folded condition illustrated in Figures 1 and 2.

The base of the bag 16 rests on a baseboard 18 composed of wood, sheet metal, or the like, the baseboard 18 being pivotally secured by means of pins 19 to the U-shaped frame 10. Also secured to the baseboard 18 are a pair of arcuately shaped arms 21 which, in the folded condition of the cart illustrated in Figures 1 and 2, provide support legs for the entire assembly.

As illustrated in the fragmentary view of Figure 3, the baseboard structure is releasably secured to the framework by means of a detent mechanism illustrated in that figure. The ends of the arms 21 are slotted as indicated at 22 so that they engage with the axle 13 in loosely fitting engagement. A locking pin 23 extends into the slot provided in the arms 21 and a leaf spring 24 urges the locking pin 23 behind the axle 13 and prevents the axle 13 from moving out of the slot 22.

As shown in Figure 2, the bag 16 may be provided with additional carrying means such as a pocket 26 secured either permanently or detachably to the rear surface of the bag 16.

To hold the bag 16 open when the assembly is used as a cart, there are a pair of adjustable spacer arms 27 on opposite sides of the bag each having one end pivotally secured to the U-shaped frame 12 through a pin 28 and its opposite end detachably secured to the wire frame 17, for example, by the type of assembly shown in Figure 4 of the drawings. As seen in that figure, each arm 27 is provided with an aperture 27a which is arranged to engage a spring clip 29 secured to the wire frame 17 in readily detachable engagement. The bag 16 is cut away at its corners, and at the pins 28, as indicated at 16a to accommodate pivoted movement of the arms 27 and locking of these arms. Thus, when the ends of the arms 27 are engaged with the spring clips 29, the bag 16 is held open in its fully extended position for the reception of clothes, food and other paraphernalia to be carried by the cart.

The cart shown in Figure 1 is readily foldable to provide a reclining type chair of the type illustrated in Figure 5 of the drawings. In folding the cart into the chair, the first step consists in emptying the contents of the bag 16, lifting out the folded mattress 39, and then folding up the bag after releasing the arms 27 from engagement with the spring clips 29. The bag, including the frame 17, is then foldable lengthwise from top and bottom into a neat package against the rear of the back frame as indicated by the flaps 31 shown in Figure 5. Clips or the like may be used to secure the flaps 31 to the frame 12 in the folded condition. At the same time, the arms 21 are disengaged from the axle 13 by releasing the detent mechanism, that is, by pulling out the pins 23 against the action of the springs 24 and folding the baseboard 18 through an arc of 180°. In this position, the baseboard 18 rests on the ground and the arcuate arms 21 form convenient arm rests for the chair in its folded position. The back supporting surface of the chair is adjustably positioned by movement of the spacer arms 27 in which are formed a plurality of notches 27b. A pair of oppositely disposed pins 32 on the opposite sides of the frame 10 are selectively received in the notches 27b to locate the backrest at the desired angle.

The assembly is also provided with a canopy structure which consists of a pair of tubular support arms 33 pivoted at opposite sides of the frame 10. As seen in Figure 1, the support arms 33 fold rearwardly of the cart when the cart is in its portable condition. The arms 33 may be provided with pins 34 extending therefrom which abut the frame 10 to locate the canopy 36 at a suitable elevation. The canopy 36 itself can be adjusted with respect to the support arms 33 by means of a sector type angle adjuster 37. A detent 38 cooperates with the angle adjuster 37 to locate the canopy 36 in the desired angular relationship with its support.

The chair is preferably provided with a mattress 39 which is preferably of the air mattress type and is secured to the frame 10 by suitable clips or the like. A cross bar 41 may be provided across the frame 10 to serve as an anchoring means for one end of the mattress. As indicated in Figure 1, the mattress may be readily stored within the empty bag 16.

The assembly is further arranged to be conveniently folded into a frame for a bed, as illustrated in Figure 6 of the drawings. To make this change, it is merely necessary to release the arms 27 from engagement with the pins 32 and to fold the arms 27 back along the frame 12 as illustrated in Figure 6 of the drawings. The frame 10 thereby forms a flat supporting surface permitting the mattress 39 to be stretched out in substantially flat form. The mattress 39 is preferably provided with a head portion 43 to serve as a pillow in this position of the assembly.

In refolding the assembly back into the cart illustrated in Figure 1, the mattress 39 is removed from the framework and the U-shaped frame 10 is then pivoted about the pivot points 11. The baseboard 18 is then folded inwardly and the axle 13 is engaged with the arms 21 by means of the detent mechanism shown in Figure 3. The canopy 36 is folded rearwardly as illustrated in Figure 1 and the spacer arms 27 are engaged with the spring clips 29, the bag 16 first having been folded out into its extended position.

From the foregoing, it will be apparent that the assembly of the present invention provides a convenient carrying cart which is completely portable, but still readily convertible into a chair having an adjustable back rest portion and a pallet type frame assembly for a bed. The cart is easily manufactured from inexpensive and available materials and requires none of the expensive machined parts characteristic of other folding bed type assemblies.

It will be evident that various modifications can be made to the described embodiment without departing from the scope of the present invention.

I claim as my invention:

1. A foldable cart comprising a generally U-shaped frame, a foldable bag secured to said frame, a support frame pivotally secured to U-shaped frame, an axle carried by said U-shaped frame, a pair of wheels supported at opposed ends of said axle, means movable with said support frame and arranged to engage said axle in a releasably secured position, and an adjustably positionable spacing means arranged to position said U-shaped frame with respect to said support frame in one position of said cart.

2. A foldable cart comprising a main frame, a foldable bag secured to said main frame, a support frame pivotally secured to said main frame, an axle carried by said main frame, a pair of wheels supported at opposed ends of said axle, a baseboard pivotally mounted to said support frame, detent means operating between said axle and said baseboard to releasably lock said baseboard to said axle, and an adjustably positionable spacing means arranged to position said main frame with respect to said support frame in one position of said cart.

3. A foldable cart comprising a first frame, a foldable bag secured to said first frame, a second frame pivotally secured to said first frame, an axle carried by said first frame, a pair of wheels supported at opposed ends of said axle, a baseboard pivotally mounted to said support frame, detent means operating between said baseboard and said axle to releasably lock said baseboard to said axle, an adjustably positionable spacing means arranged to position said first frame with respect to said second frame in one position of said cart, and means for releasably securing said spacing means with said bag so that said spacing means holds said bag open in one position of said cart.

4. A foldable cart comprising a pair of pivotally connected frame members, an axle passing through the extremities of one of said frame members, a pair of wheels rotatably mounted on said axle, a baseboard detachably secured to said one frame member and pivotally secured to the other of said frame members, a foldable bag carried by said frame members and said baseboard, said frame members being pivotable into a first position in which said bag is extended into its open position, said frame members being pivotable into a second position in which said frame members are substantially coplanar, thereby providing a pallet-type structure, and said frame members being pivotable into a third position in which said other frame member provides part of a back-rest structure and said baseboard provides a seat portion in a chair-type structure.

5. A foldable cart comprising a pair of pivotally connected frame members, a pair of wheels rotatably mounted from one of said frame members, a baseboard detachably secured to said one frame member and pivotally secured to the other of said frame members, a foldable bag carried by said frame members and said baseboard, said frame members being pivotable into a first position in which said bag is extended into its open position, said frame members being pivotable into a second position in which said frame members are substantially coplanar, thereby providing a pallet-type structure, and said frame members being pivotable into a third position in which said other frame member provides part of a back-rest structure and said baseboard provides a seat portion in a chair-type structure.

References Cited in the file of this patent

UNITED STATES PATENTS

| | | |
|---|---|---|
| 1,605,679 | McGrail | Nov. 2, 1926 |
| 1,769,418 | Cooper et al. | July 1, 1930 |
| 2,070,484 | Jones | Feb. 9, 1937 |
| 2,571,139 | Johnson | Oct. 16, 1951 |

FOREIGN PATENTS

| | | |
|---|---|---|
| 457,183 | Great Britain | Jan. 31, 1935 |